3,564,843
PARTICULATE TRAP

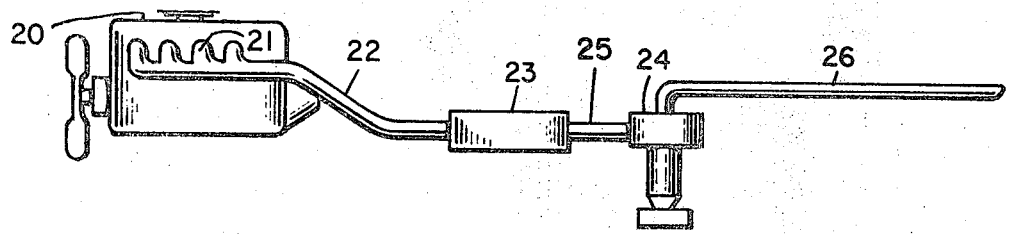
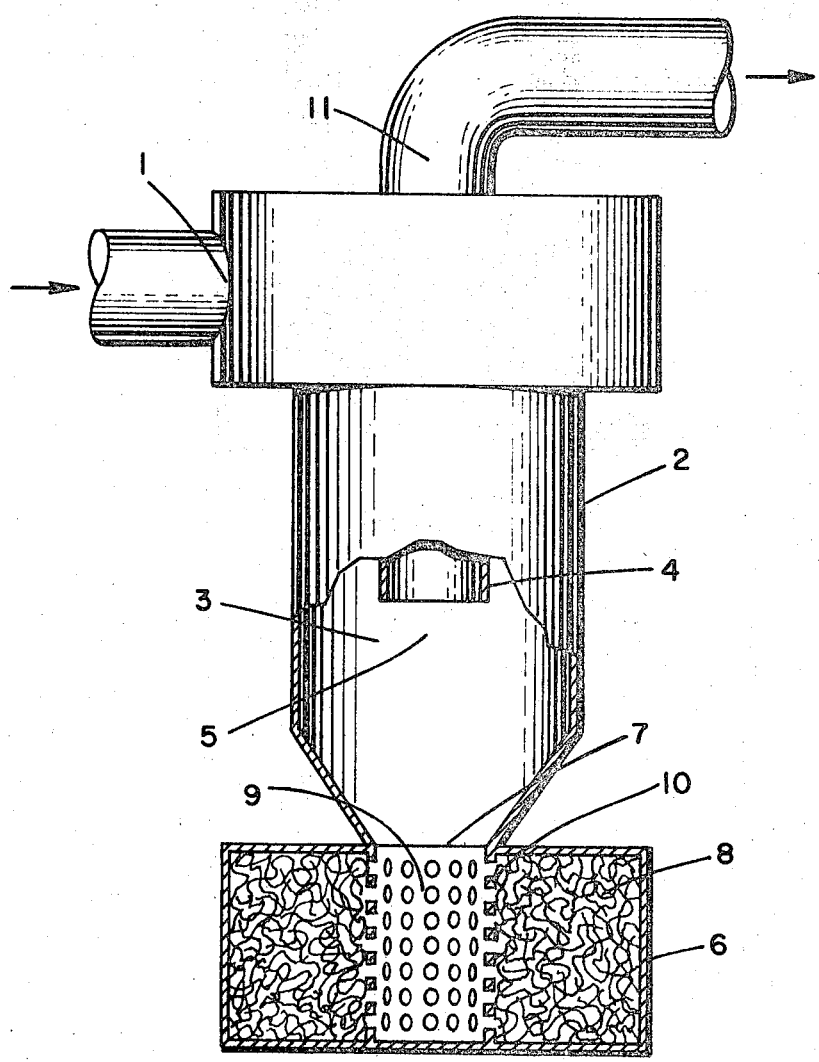

Daniel A. Hirschler, Jr., Birmingham, and Denis L. Lenane, Ferndale, Mich., assignors to Ethyl Corporation, New York, N.Y., a corporation of Virginia
Filed Feb. 27, 1969, Ser. No. 802,987
Int. Cl. F02b 75/10
U.S. Cl. 60—29　　　　　　　　　　　　　13 Claims

ABSTRACT OF THE DISCLOSURE

A cyclone particulate separator having a mesh-lined collection chamber such that the mesh defines a hollow cylindrical core having the same diameter as the reject hole. A perforated liner can be placed in the core. Prevents the re-entrainment of particulates removed from a pulsating gas stream such as the exhaust stream from an internal combustion engine.

BACKGROUND

Cyclone traps have been used for some time to remove particulates from gas streams. Although they function quite well under steady state conditions, they leave much to be desired when they are used to remove dust or other particulates from a pulsating gas stream. One reason for this is that the pulsating gas tends to re-entrain the particulates in the collection chamber and exhausts them to the atmosphere. An example of such a pulsating gas stream where re-entrainment is a problem is the exhaust gas from an internal combustion engine. Although cyclone traps have been used to remove particulates from exhaust gas (U.S. 3,253,400; 3,197,955; 3,162,518; 3,154,389; 3,132,473; 3,056,662) their efficiency is limited to some extent by the re-entrainment problem.

SUMMARY

The present invention relates to a cyclone trap having a means to greatly reduce re-entrainment of particulates once they enter the collection chamber. This is accomplished by placing a mesh-like material in the collection chamber in such a manner as to form a hollow cylindrical core in the collection chamber having substantially the same diameter as the opening into the collection chamber from the cyclone chamber. This invention relates further to an exhaust system for an internal combustion engine having a trap of the above type in the system.

DESCRIPTION OF THE DRAWINGS

FIG. 1 is a partially cut-away view of a typical cyclone trap showing the inner construction of the collection chamber.

FIG. 2 is a schematic of an exhaust system for an internal combustion engine including a muffler and a cyclone particulate trap.

DESCRIPTION OF THE PREFERRED EMBODIMENTS

A preferred embodiment of this invention comprises a cyclone particulate trap in which the collection chamber is constructed in a manner that greatly reduces re-entrainment. Cyclone traps are conventional inertial separators generally consisting of a radially symmetric body which may be cylindrical or in the form of an inverted cone into which is introduced adjacent one end a particulate-laden gas in such a manner that the gas spirals towards the opposite end. The spiraling motion is usually obtained by either introducing the gas tangentially or by having deflector vanes or a combination of these means. Located centrally at the opposite end is a hole called a reject hole, through which the particulate matter passes into the collection chamber. When the spiraling gas reaches this end it reverses direction, and then spirals axially back up towards the same end from which it came, but inside the original vortex. The purified gas enters a discharge conduit from which it exits the trap. Conventional cyclone designs are well known and tables of detailed dimensions are available from many sources.

The collection chamber of the trap of this invention contains a mesh-like material positioned in such a manner as to form an axial hollow cylindrical core having about the same diameter as the reject hole. It is important that the mesh be so positioned because, if the collection chamber is merely filled with mesh, the reject hole tends to plug. When the mesh in the collection chamber is arranged as described herein the reject hole does not plug and, as demonstrated in tests to be later described, the amount of re-entrainment is greatly reduced compared to the same cyclone trap without the mesh in the collection chamber.

The invention is more readily understood by referring to the drawings. In FIG. 1 is shown a partially cut-away drawing of a typical commercial cyclone trap. In operation, a particulate-laden gas enters the cyclone trap at inlet 1 and is given a cyclonic motion by standard means such as deflector vanes (not shown). The gas spirals down cyclone chamber 2 in the annular space 3 between the walls of the cyclone chamber and discharge conduit 4. The particles are thrown against the walls of the cyclone chamber, lose velocity, and are swept towards the bottom. When the spiraling gas reaches the bottom of the cyclone chamber it abruptly reverses direction and spirals up, entering discharge chamber 4 at opening 5. A large portion of the particulates in the gas stream enter collection chamber 6 through reject hole 7. In collection chamber 6, wire mesh 8 is positioned to form a hollow cylindrical core 9 around the common axis of cyclone chamber 2 and discharge conduit 4, and having substantially the same diameter as reject hole 7. Cylindrical core 9 is preferably lined with perforated cylindrical core liner 10 which helps maintain the structural integrity of cylindrical core 9 and improves collection efficiency. Particulate matter entering collection chamber 6 through reject hole 7 passes through the perforations in core liner 10 and enters the quiescent zone in the interstitial space of mesh 8. Meanwhile, the purified gas entering discharge conduit 4 passes up through conduit 4 and leaves the trap at outlet 11. From there, it is either discharged to the atmosphere or used in some further process requiring a low particulate gas.

A highly preferred embodiment of the invention is its use in an exhaust system for an internal combustion engine. FIG. 2 shows a typical arrangement. In operation, internal combustion engine 20, which may be either a spark ignited or diesel engine, discharges its exhaust gas containing some particulates through exhaust manifold 21 into exhaust pipe 22 which conducts the exhaust to muffler 23. The conventional muffler 23 is preferably placed in the exhaust system between the exhaust manifold 21 and cyclone trap 24, although the muffler can optionally be placed in the exhaust system downstream from cyclone trap 24. After leaving muffler 23, the exhaust gas is conducted through conduit 25 to inlet 1 of cyclone trap 24 which has the mesh-lined collection chamber previously described. The particulates in the exhaust are removed in the manner previously described. The cleaned exhaust then leaves cyclone trap 24 at outlet 11 and is conducted to a more remote location by tail pipe 26.

The material placed in the collection chamber has been called a "mesh-like material" and, indeed, the preferred material is a mass of entangled wire having a diameter of from 0.005–0.05 inch uniformly compressed to form a porous mesh having a density of about 6–24 pounds per cubic foot. A more preferred mesh is made from wire having a diameter of from about 0.009–0.015 inch uniformly compressed to form a porous mesh having a density of about 12 pounds per cubic foot. The function of this mesh appears to be to form a quiescent zone. Other equivalents can be used to provide this same quiescent zone, although not necessarily as efficiently. For example, metal turnings, steel wool, marble chips, gravel, expanded metal, and the like, can be used in the collection chamber so long as they can be retained in such a position as to form an axial hollow cylindrical core having about the same diameter as the reject hole. With materials such as marble chips, gravel, and the like, the cylindrical core is maintained by the perforated core liner.

Tests have been carried out to show the results obtained by the present invention compared to results obtained using the same cyclone trap but without the mesh-modified collection chamber. In these tests a modern 327 cubic inch V-8 spark ignited internal combustion engine was operated on a typical commercial gasoline containing tetraethyllead at a speed and load simulating a slight hill climb at 30 m.p.h. The exhaust gas was passed through a standard commercial cyclone trap (Aerotec Design No. 2, U.O.P. Air Correction Division, Greenwich, Conn.). In one test the collection chamber was of the standard type—that is, it did not have the mesh modification described herein. In a second test the collection chamber was modified to contain a stainless steel wire mesh (0.011 wire uniformly compressed to a density of 12 pounds per cubic foot), available from A.C.S. Industries, Woonsocket, R.I., arranged to form a hollow cylindrical core having the same diameter as the reject hole.

In conducting the test, two criteria were observed. First, the engine was run for 24 hours and the actual amount of particulate collected with and without the mesh was determined. Next, a measured amount (about 500 grams) of a fine grade of Arizona dust was placed in a standard and in a mesh-modified collection chamber and the engine operated for 2 hours. The amount of dust that re-entrained and was blown out with the exhaust was determined. The results of the tests are shown in the following table.

|  | Collection chamber, gms. | |
| --- | --- | --- |
|  | Standard | Mesh-modified |
| Weight of particulates collected in 24 hours | 28 | 135 |
| Weight of dust entrained in 2 hours | 240 | 40 |

As the above tests show, the mesh-modified gave a collection improvement factor of 480 percent compared to the standard collection chamber. Likewise, the mesh-modification gave an 84 percent reduction in re-entrainment.

The above collection efficiency test was repeated using a mesh-modified collection chamber in which a perforated core liner had been placed. These results were as follows:

Weight of particulates collected in 24 hours, standard, 13 gms.; mesh plus liner, 81 gms.

This test shows that even more dramatic improvement can be obtained using the perforated core liner embodiment of the invention. In the above test this embodiment gave a 620 percent improvement in particulate collection compared to the same cyclone trap not modified to contain the mesh and perforated core liner

We claim:

1. In a cyclone type particulate trap for removing particulates from a gas stream, said trap comprising:

(a) a cyclone housing having a side wall with a substantially circular cross section and an end wall defining a cyclone chamber having an inlet in said side wall adjacent said end wall, (b) means for introducing particulate-laden gas into said side cyclone housing through said inlet in said side wall in a cyclonic flow pattern about the axis of and within said cyclone housing.

(c) a collector housing having a collector side wall, bottom wall and top wall, said top wall being connected to said cyclone housing at the end opposite said end wall and communicating with said cyclone chamber defined by said cyclone housing through a reject hole co-axial with said cyclone housing, and (d) a discharge conduit within and co-axial with said cyclone housing connected to said end wall of said cyclone housing and adapted to conduct purified gas out of said cyclone housing through said end wall, said conduit having an open end positioned within said cyclone housing between said inlet and said reject hole, the improvement wherein said collector housing is substantially filled with a mesh-like body defining a hollow cylindrical core, said hollow core being substantially co-axial with and substantially the same diameter as said reject hole.

2. The apparatus of claim 1 wherein said mesh-like body is a wire mesh in which the wire is about 0.005–0.05 inch in diameter and said wire mesh is uniformly compressed to a density of about 6–24 pounds per cubic foot.

3. A trap of claim 1 wherein said mesh-like body is a wire mesh in which the wire is about 0.009–0.015 inch in diameter and said wire mesh is uniformly compressed to a density of about 12 pounds per cubic foot.

4. A cyclone type particulate trap of claim 1 having said inlet in said side wall connected to one end of an exhaust gas conduit and the other end of said exhaust gas conduit connected to the outlet of an exhaust manifold of an internal combustion engine in a manner such that during operation of said internal combustion engine the exhaust gas formed is conducted to said inlet in said side wall and enters said cyclone housing.

5. The exhaust system of claim 4 wherein said internal combustion engine is a spark ignited internal combustion engine.

6. An exhaust system of claim 5 wherein said mesh-like body is a wire mesh in which the wire is about 0.005–0.05 inch in diameter and said wire mesh is compressed to a density of about 6–24 pounds per cubic foot.

7. An exhaust system of claim 6 wherein said wire mesh is a steel wire mesh in which the wire has a diameter of about 0.009–0.015 inch and said wire meshes compressed to a density of about 12 pounds per cubic foot.

8. A cyclone trap as defined in claim 1 further characterized by having a perforated cylindrical core liner in said axial hollow cylindrical core, said core liner having about the same inside diameter as said reject hole.

9. A cyclone type particulate trap of claim 8 having said inlet in said side wall connected to one end of an exhaust gas conduit and the other end of said exhaust gas conduit connected to the outlet of an exhaust manifold of an internal combustion engine in a manner such that during operation of said internal combustion engine the exhaust gas formed is conducted to said inlet in said side wall and enters said cyclone housing.

10. An exhaust system of claim 9 wherein said mesh-like body is a wire mesh in which the wire is about 0.005–0.05 inch in diameter and said wire mesh is uniformly compressed to a density of about 6–24 pounds per cubic foot.

11. An exhaust system of claim 10 wherein said mesh-like body is a wire mesh in which the wire is about 0.009–0.015 inch in diameter and said wire mesh is uniformly compressed to a density of about 12 pounds per cubic foot.

12. A cyclone trap of claim 8 wherein said mesh-like body is a wire mesh in which the wire is about 0.005–0.05 inch in diameter and said wire mesh is uniformly compressed to a density of about 6–24 pounds per cubic foot.

13. A cyclone trap of claim 12 wherein said mesh-like body is a wire mesh in which the wire is about 0.009–0.015 inch in diameter and said wire mesh is uniformly compressed to a density of about 12 pounds per cubic foot.

References Cited

UNITED STATES PATENTS

| | | | |
|---|---|---|---|
| 1,719,119 | 7/1929 | McKain | 209—144 |
| 2,334,263 | 11/1943 | Hartwell | 55—526 |
| 3,056,662 | 10/1962 | Ridgway | 55—ET |
| 3,400,784 | 9/1968 | Thrasher | 181—66 |

FRANK W. LUTTER, Primary Examiner

B. NOZICK, Assistant Examiner

U.S. Cl. X.R.

55—337, 459, 526

PO-1050
(5/69)

UNITED STATES PATENT OFFICE
CERTIFICATE OF CORRECTION

Patent No. 3,564,843      Dated February 23, 1971

Inventor(s) Daniel A. Hirschler, Jr., and Denis L. Lenane

It is certified that error appears in the above-identified patent and that said Letters Patent are hereby corrected as shown below:

Column 4, Claim 1, under (b), line 6, delete "side" before "cyclone"; Claim 7, line 53, "meshes" should read -- mesh is Signed and sealed this 25th day of May 1971.

(SEAL)
Attest:

EDWARD M. FLETCHER, JR.
Attesting Officer

WILLIAM E. SCHUYLER, JR
Commissioner of Patents